US006114771A

United States Patent [19]

Takagi et al.

[11] Patent Number: 6,114,771

[45] Date of Patent: Sep. 5, 2000

[54] STARTER WITH PINION ROTATION RESTRICTING MEMBER

[75] Inventors: Yoshito Takagi, Toyohashi; Takeshi Araki, Nishikasugai-gun; Kazuhiro Ando, Okazaki, all of Japan

[73] Assignee: Denso Corporation, Kariya, Japan

[21] Appl. No.: 09/150,009

[22] Filed: Sep. 9, 1998

[30] Foreign Application Priority Data

Feb. 5, 1998 [JP] Japan .................................. 10-024318

[51] Int. Cl.[7] .............................. F02N 11/00; H02P 9/04; H02K 7/06

[52] U.S. Cl. ............................................ 290/38 R; 310/83

[58] Field of Search ............................ 310/83; 74/6, 7 R, 74/7 A, 7 E; 290/38 R, 48

[56] References Cited

U.S. PATENT DOCUMENTS

| | | | |
|---|---|---|---|
| 5,600,184 | 2/1997 | Shiga et al. | 290/38 R |
| 5,610,445 | 3/1997 | Shiga et al. | 290/38 R |
| 5,621,249 | 4/1997 | Shiga et al. | 290/38 R |
| 5,767,585 | 6/1998 | Shiga et al. | 290/38 R |
| 5,777,393 | 7/1998 | Katoh et al. | 290/48 |
| 5,780,934 | 7/1998 | Imanishi et al. | 290/38 R |
| 5,814,896 | 9/1998 | Araki | 290/38 R |
| 5,892,421 | 4/1999 | Matsushima | 335/126 |
| 5,945,742 | 8/1999 | Araki et al. | 290/38 R |

FOREIGN PATENT DOCUMENTS

| | | |
|---|---|---|
| 50-5807 | 1/1975 | Japan . |
| 55-117073 | 9/1980 | Japan . |

*Primary Examiner*—Clayton LaBalle

*Attorney, Agent, or Firm*—Pillsbury Madison & Sutro LLP

[57] ABSTRACT

A resilient restricting member of a rotation restricting member which restricts a pinion moving body from rotating is accommodated in a frame of a restricting member holder under a flexed and loaded state so that the rotation restricting member has a sufficient rotation-restricting function as long as the rotary force of the pinion moving body does not exceed the load acting thereon at the time of engagement and restriction of rotation. When a pinion gear abuts the end face of a ring gear and the pinion moving body is restricted from moving forward, the entire rotary force of an output shaft acts on the pinion moving body. The resilient restricting member flexes further in the restricting member holder to allow rotation of the pinion moving body, thus enabling the pinion gear to mesh the ring gear. Thus, the rotary force of the output shaft is converted to the advancing force of the pinion moving body surely even when the spiraling of the helical spline is not so large.

11 Claims, 8 Drawing Sheets

STARTER WITH PINION ROTATION RESTRICTING MEMBER

CROSS REFERENCE TO RELATED APPLICATION

This application relates to and incorporates herein by reference Japanese Patent Application No. 10-24318 filed on Feb. 5, 1998.

BACKGROUND OF THE INVENTION

1. Field of the Invention

The present invention relates to a starter for starting an engine of an automotive vehicle and the like.

2. Related Art

Japanese Patent Laid-open Publication No. 55-117073 discloses an inertia push-in type starter. In this starter, a pinion is pushed out to a ring gear side of an engine by an action of helical splines of a driving shaft and a pinion moving body by using inertia of the pinion moving body at the time of a start of rotation of the driving shaft.

As the rotary force of the driving shaft is converted to the advancing force of the pinion moving body by using the inertia of the pinion moving body, the spiraling of the helical splines is set small (lead is set small). This enables the pinion moving body to advance with ease even when the increase in the rotational speed (acceleration in rotation) of the driving shaft is small. On the other hand, when the rotational speed of the ring gear exceeds the rotational speed of the pinion temporarily due to fluctuation of the engine rotation during driving the engine, the pinion moving body is likely to be pushed back by the action of the helical splines. Further, because it is difficult to provide the advancing force, the impact shock produced when the pinion gear collides the end face of the ring gear becomes large. Thus, it is likely that meshing is degraded and the gear end faces are damaged. It becomes necessary to overcome the former disadvantage that a retreat restricting mechanism such as a governor device is provided for maintaining the advanced state of the pinion moving body. Because of the latter disadvantage, the above starter is used only for motor cycle engines and general-purpose engines which have low loads and require less durability.

To overcome the above disadvantage, Japanese Patent Laid-open Publication No. 50-5807 teaches as another conventional starter. In this starter, rotation of a pinion moving body fitted with the helical spline of a driving shaft is restricted by a separate member to push out the pinion moving body to a position where its pinion gear engages the ring gear of an engine.

At the time of driving this starter, because the rotary force received from the driving shaft is restricted by an absorbing plate, the rotary force is converted to advancing force by the action of the helical splines of the driving shaft and a spline tube so that the pinion moving body is moved to the ring gear side. As a result, the rotary force of the driving shaft can be converted to the propulsion force for the pinion moving body in the axial direction without fail, even when the spiraling of the helical spline is set not so large. Further, as the rotation restriction is released at the time of completing the meshing between the pinion gear and the ring gear, the push-back force does not become so large even when the rotational speed of the ring gear exceeds the rotational speed of the pinion gear. Thus, no governor device is required. Further, as opposed to an electromagnetic push-in type starter in which normal electromagnet switch is used to push out a pinion moving body, it is not necessary to move the pinion moving body to the ring gear side by the force of the electromagnet switch itself through a drive lever and the like. As it is possible to use magnetic field of a motor or to use a small-sized electromagnet switch, it is advantageous that the starter can be reduced in size and in weight correspondingly, resulting in cost reduction.

However, in the above starter, as the advancing force for the pinion moving body is provided by restricting the movement in the rotational direction, the spiraling of the helical splines need not be set large so much. As a result, most of the rotary force of the driving shaft can be transmitted to the absorbing plate through the pinion moving body. That is, it is necessary to set the coupling force of friction force generating parts for withstanding the rotary force so that the absorbing plate restricts rotation of the pinion moving body. Further, as the friction coupling has generally its dynamic friction coefficient smaller than its static friction coefficient, it is impossible to stop rotation unless the rotary force decreases, once sliding starts to occur. That is, it becomes necessary to prevent slippage. This means that, when the pinion gear advances and abuts the end face of the ring gear because of misalignment of the teeth protrusions of the pinion gear with the teeth grooves of the ring gear, the pinion gear is disabled to rotate under the advance-stopped state for meshing the ring gear.

SUMMARY OF THE INVENTION

It is therefore an object of the present invention to provide a starter which overcomes the above disadvantages.

It is a further object of the present invention to provide a starter which enables rotation of a pinion gear a predetermined angle for alignment with teeth of a ring gear when the pinion gear abuts the end face of the ring gear, while assuring rotation restricting force for the pinion moving body.

According to the present invention, a rotation restricting member is initially loaded in a counter-rotation direction at the time of engaging with a pinion moving body having a pinion gear which tends to rotate with a driving shaft, so that it may restrict the rotation in opposition to the pinion moving body and advance the pinion moving body toward a ring gear quickly. When the pinion gear can not advance further because of abutment with the end face of the ring gear, the rotary force of the driving shaft is transmitted to the pinion moving body. The rotation restricting member is flexed by a rotary force which exceeds the initial load of the rotation restricting member, so that the teeth of each gear are aligned by the rotation to secure meshing. Thus, not only a driving power source necessary for the meshing can be reduced in size, but also durability of operation can be improved by the good meshing capability.

Preferably, when engaging the pinion moving body which tends to rotate by the driving shaft for restricting rotation, the initial load applied in the counter-rotation direction is provided separately by a resilient restricting member which restricts rotation of the pinion moving body, by a resilient member disposed between the resilient restricting member and a fixed member of a starter. Thus, the stress of the resilient restricting member and the resilient member is reduced and the durability of operation at the time of meshing can be improved.

Preferably, the rotation restricting member is constructed so that the component of force of the load generated upon its resilient deformation acts in the counter-rotation direction of the driving shaft, when the rotation restricting member engages the pinion moving body.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENTS

Figure 1:
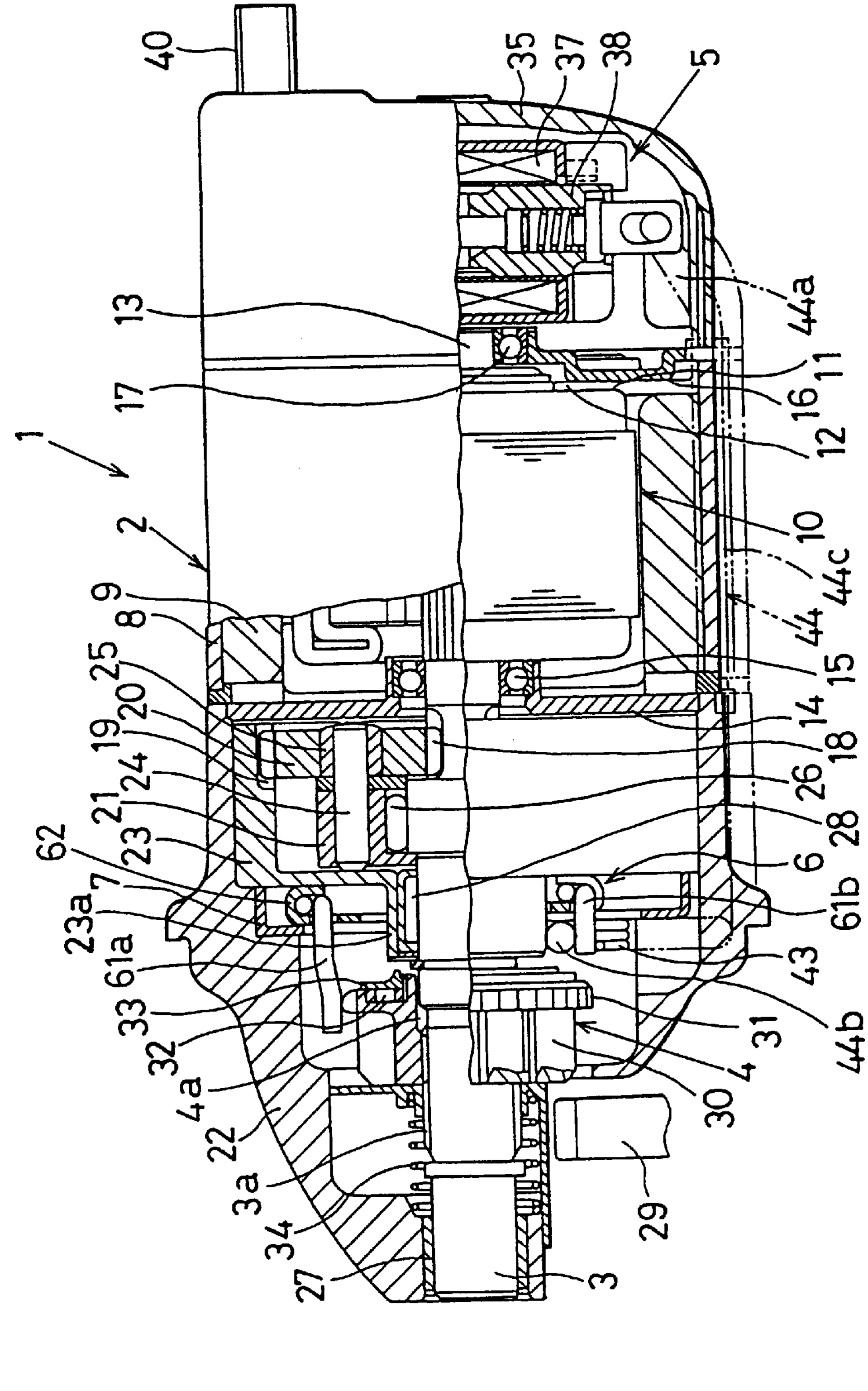
FIG. 1 is a sectional view showing a starter according to a first embodiment of the present invention.

A starter according to the present invention will be described more in detail with reference to various embodiments shown in the accompanying drawings. Same or like component parts are denoted by the same or like reference numerals throughout the embodiments.

[First Embodiment]

A starter (engine starting device) 1 of this embodiment is made up of, as shown in FIG. 1, a starter motor 2 for generating a rotational force, a planetary reduction gear mechanism for decelerating rotation generated by the starter motor 2, an output shaft (driving shaft) 3 for rotating upon receiving the speed-reduced rotation from the reduction gear mechanism, a pinion moving body 4 fitted onto the output shaft 3, an electromagnet switch 5 for controlling current supply to the starter motor 2, a rotation restricting member 6 for restricting rotation of the pinion moving body 4 when the starter motor 2 starts rotating, and a plate 7 to hold the rotation restricting member 6 in the axial direction and guide operation in circumferential and radial directions. The starter motor 2 is constructed by a cylindrical yoke 8 forming a magnetic frame, fixed magnetic poles 9 (e.g., a plurality of permanent magnets) secured to the inner periphery of the yoke 8, an armature 10 rotatably disposed inside the inner periphery of the fixed magnetic poles 9, and brushes 12 in sliding contact with a commutator 11 provided at the rear end face (right end face in FIG. 1) of the armature 10.

The armature 10 is rotatably supported with one end of a rotation shaft 13 being rotatably supported via a bearing 15 held by a separating plate 14 which separates the armature 10 from the reduction gear mechanism and with the other end of the rotation shaft 13 being rotatably supported via a bearing 17 held by a partition 16 which separates the armature 10 from the electromagnet switch 5. The planetary reduction gear mechanism is composed of a sun gear 18 (outer teeth) formed around the outer periphery on one end face of the rotation shaft 13, an internal gear 19 (inner teeth) radially positioned around the outer periphery of the sun gear 18, a plurality of planetary gears 20 which are interposed between the sun gear 18 and the internal gear 19 in mesh with both gears 18 and 19, and a carrier 21 rotatably supporting the planetary gears 20.

The internal gear 19 is formed on the internal periphery of a gear forming member 23 subjected to rotational restriction on the internal periphery of a front housing 22. The planetary gears 20 are rotatably supported via bearings 25 inserted onto the outer periphery of pins 24 which are press-fitted into the carrier 21. The carrier 21 is positioned on the outer periphery of the rear end of the output shaft 3 with rollers 26 being placed between the carrier 21 and the rear end thereof, forming a unidirectional clutch with the rear end thereof and the rollers 26. This unidirectional clutch transmits the rotation output of the reduction gear mechanism via the rollers 26 to the output shaft 3.

The output shaft 3 is coaxially arranged with the rotation shaft 13. Its one end is rotatably supported via a bearing 27 which is supported by the front housing 22 while the other end is rotatably supported via a bearing 28 which is supported by the inner cylindrical part 23*a* of the gear forming member 23. On the outer periphery between both bearings 27 and 28 of the output shaft 3, there is formed a helical spline 3*a*, onto which a helical spline 4*a* formed in the internal periphery of the pinion moving body 4 is fitted.

Figure 2:
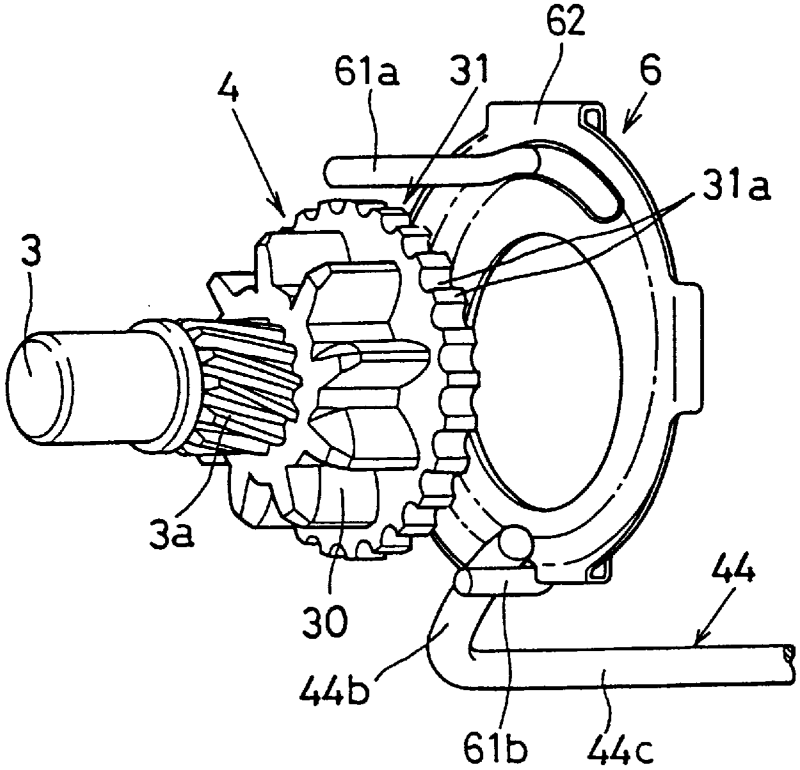
FIG. 2 is a perspective view showing a pinion moving member and a rotation restricting member used in the first embodiment.

The pinion moving body 4 includes a pinion gear 30 to mesh with a ring gear 29 which is provided on the drive shaft of the engine (not shown), and a flange 31 on the rear side of the pinion gear 30 which has a larger outside diameter than that of the pinion gear 30 and which is formed with a multiplicity of teeth protrusions and grooves 31*a* as shown in FIG. 2 on the outer periphery thereof; a washer (thrust bearing) 33 which is rotatably supported via a roller 32 is disposed on the rear end face thereof.

The pinion moving body 4, which is axially movably provided through meshing of the helical spline 3*a* of the output shaft 3 with the helical spline 4*a* of the pinion moving body 4, is biased normally toward the rear side of the starter 1 (opposite side of the ring gear 29) by a spring 34 arranged in front of the pinion gear 30. The electromagnet switch 5 is disposed on the rear end of the starter 1 and fixed to the inner periphery of a bowl-shaped rear case 35.

This electromagnet switch 5 comprises an attraction coil 37 which is turned on with the closing of a key switch 36 (FIG. 7) and a plunger (movable iron core) 38 movably provided on the inner periphery of the attraction coil 37, movement of the plunger 38 being followed by the making and breaking of a motor contact interposed in an electric circuit (FIG. 7) of the starter motor 2. It is to be noted that the attraction coil 37 and the plunger 38 are disposed so that the plunger 38 will move in the radial direction of the rear case 35 (upward and downward directions in FIG. 1).

Figure 7:
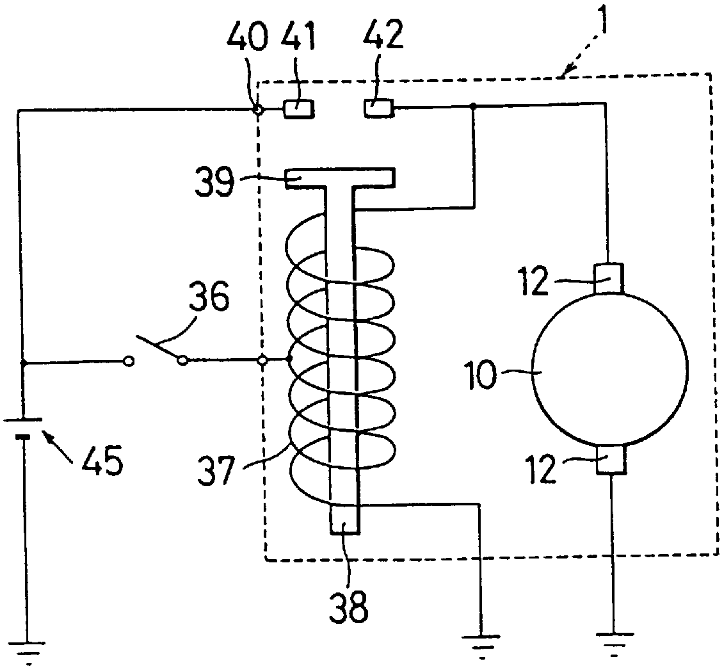
FIG. 7 is an electric circuit diagram of the starter.

As shown in FIG. 7, the motor contact is made up of a movable contact 39 attached to the upper end of the plunger 38, a battery side fixed contact 41 integrally constructed with a battery terminal 40 fixed to the rear case 35, and a motor side fixed contact 42 connected to the brush (anode side) 12. When the plunger 38 is attracted and moves upward in FIG. 1, the movable contact 39 comes into contact with both fixed contacts 41 and 42, thereby supplying current thereto.

Figure 3:
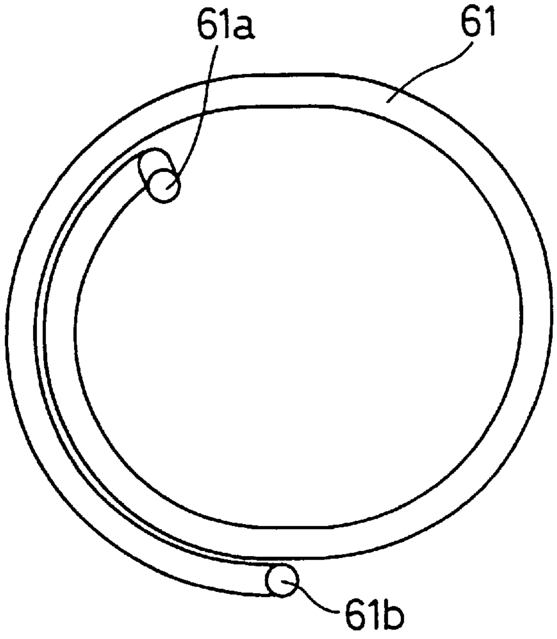
FIG. 3 is a front view showing the rotation restricting member used in the first embodiment.
Figure 4A:
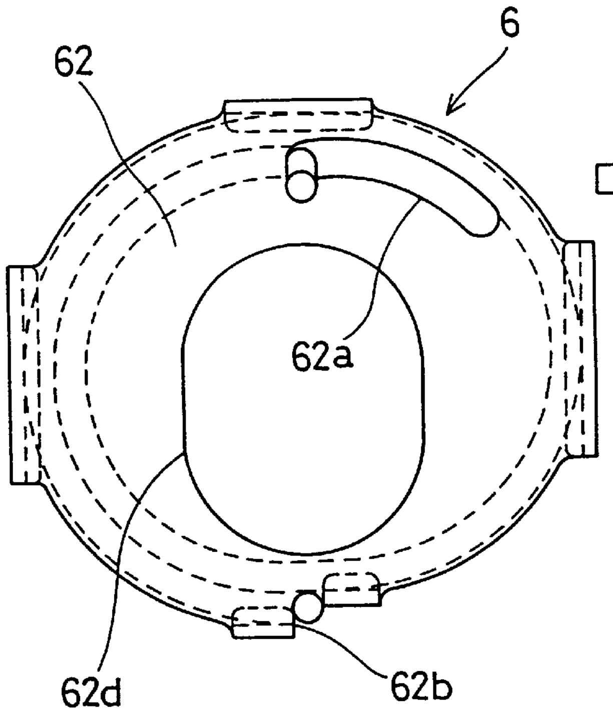
FIGS. 4A and 4B are a front view and a sectional view showing the rotation restricting member used in the first embodiment.
Figure 4B:
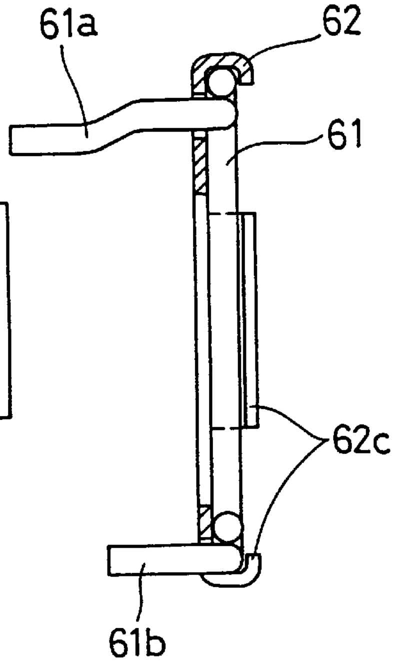

The rotation restricting member 6 comprises two members. As shown in FIGS. 2 and 3, a resilient restricting member 61 as the first member is formed by winding a metallic rod member into a loop and bending both ends 61*a* and 61*b* substantially perpendicularly in the same direction. Of both ends 61*a* and 61*b*, one end (upper protrusion) 61*a* is set longer while the other end (lower protrusion) 61*b* is set shorter. With regard to the positional relation between the upper protrusion 61*a* and the lower protrusion 61*b*, although provided oppositely around the center of the loop, the upper protrusion 61*a* is provided at a position displaced a little to the left side in FIG. 3. A restricting member holder 62 as the second member of the rotation restricting member 6 is, as shown in FIGS. 4A and 4B, in a plate shape which has an outer configuration substantially similar to the outer configuration of the resilient restricting member 61. The holder 62 has a holding part 62*c* for holding the outer periphery of the resilient restricting member 61. The holding part 62*c* is formed by a part of end parts on the four sides in one direction and further bending top ends inwardly. The holder 62 also has on its planar part an arcuate longitudinal slot 62*a* for receiving the upper protrusion 61*a* movably therein, an engagement groove 62*b* for receiving the lower protrusion 61*b* and a central hole 62*d* for passing the output shaft 3 therethrough.

The resilient restricting member 6 is accommodated in the inside of the holding part 62*c* of the restricting member holder 62 under the condition that the resilient restricting member 61 shown in FIG. 3 is contracted in its winding direction into a reduced diameter. The upper protrusion 61*a* and the lower protrusion 61*b* are received in the longitudinal slot 62*a* and the engagement groove 62*b*, respectively, to protrude therefrom in the pinion advancing direction.

The rotation restricting member 6 is so arranged that the restricting member holder 62 is disposed around the outer periphery of an inner cylinder 23*a* of the gear forming member 23 in a space formed between the plate 7 arranged in front of the gear forming member 23 in the front housing 22. The upper protrusion 61*a* and the lower protrusion 61*b* are taken out forwardly through the plate 7 so that the entire assembly is movable in the upward and downward directions in FIG. 1.

The upper protrusion 61*a* taken out through the plate 7 forwardly is taken out of the radially upper part of the plate 7 (radially outside of the outer periphery of the flange 31 of the pinion moving body 4), and the tip thereof is positioned ahead of the flange 31 of the pinion moving body 4. The lower protrusion 61*b* is taken out of the radially lower part of the plate 7, and the tip thereof is positioned behind the washer 33 of the pinion moving body 4.

Figure 5:
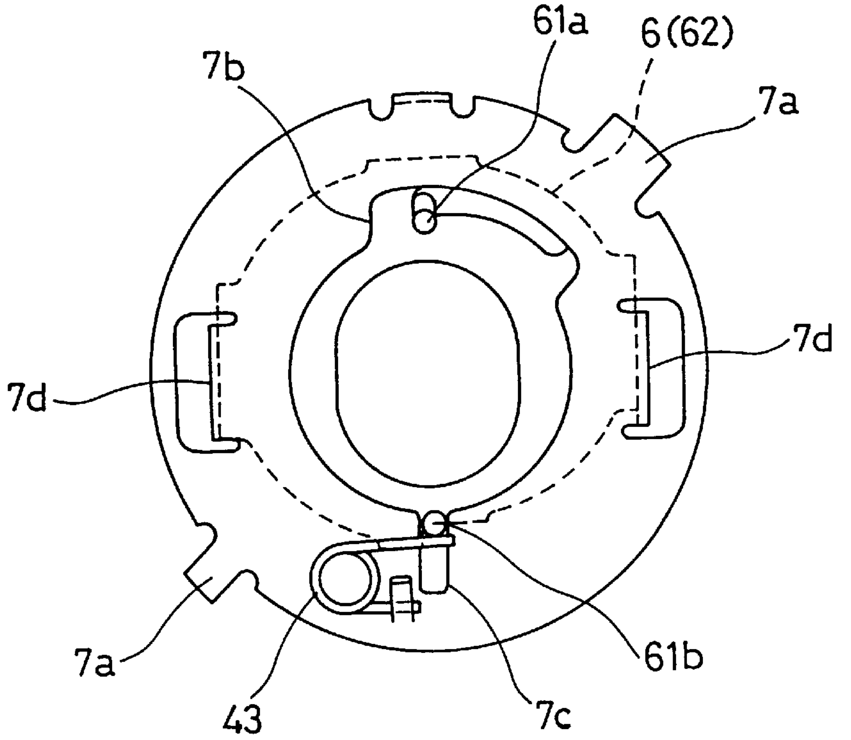
FIG. 5 is a front view showing a relation between the rotation restricting member and a plate used in the first embodiment.
Figure 6:
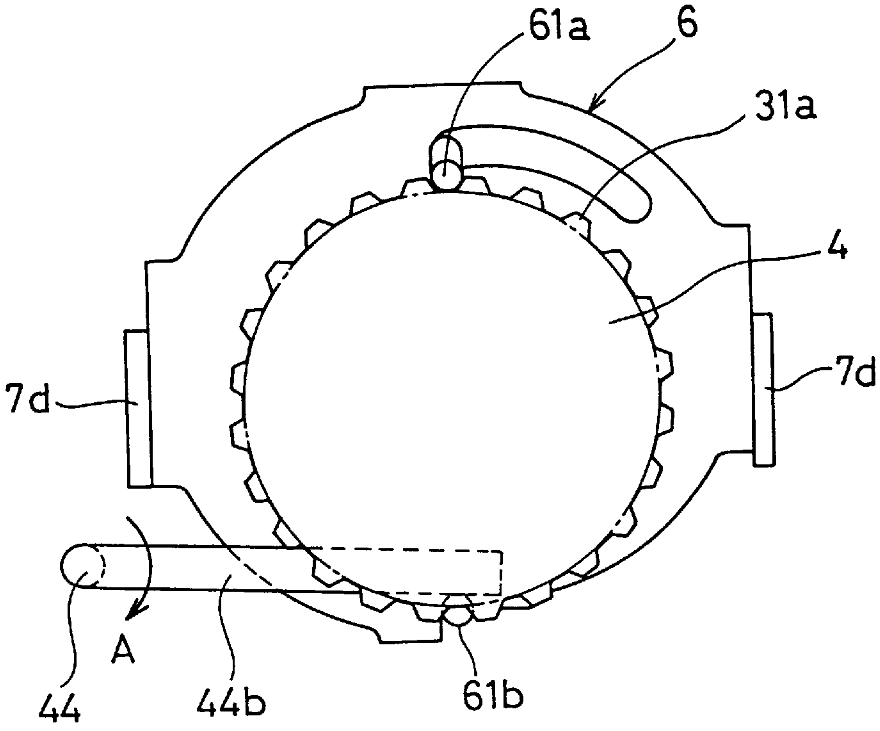
FIG. 6 is a front view showing a relation between the rotation restricting member and the pinion moving body.

FIG. 5 shows a relation between the rotation restricting member 6 and the plate 7, while FIG. 6 shows that the rotation restricting member 6 operates and is engaged with the teeth protrusions and grooves 31*a* of the pinion moving body 4. Each figure shows views when taken from the advancing direction of the pinion moving body (ring gear side). The lower protrusion 61*b* of the rotation restricting member 6 is located at substantially the center in the moving direction of the rotation restricting member 6, while the upper protrusion 61*a* is located above in the opposite moving direction of the rotation restricting member 6 in relation to the pinion moving body 4.

The rotation restricting member 6 is arranged to be slidably movable in the upward and downward directions in the figures, with both side parts of its holder 62 being supported slidably by a guide wall 7*d* provided by bending a part of the plate 7.

A spring 43 fixed to the plate 7 is hooked on the lower protrusion 61*b* so that the rotation restricting member 6 is being normally biased upward in FIG. 1 due to the biasing force of the spring 43. It will be noted that the rotation restricting member 6 can be moved downward in FIG. 1 against the biasing force of the spring 43 as the operating force of the electromagnet switch 5 (movement of the plunger 38) is transmitted through a rod 44.

As shown in FIG. 1, the rod 44 comprises a moving part 44*a* engaging the plunger 38 to follow the movement of the plunger 38, an operation part 44*b* engaging the lower protrusion 61*b* to operate the lower protrusion 61*b*, and a bar-shaped coupling part 44*c* connecting the moving part 44*a* to the operation part 44*b*. The coupling part 44*c* extends generally in parallel to the rotation shaft 13 radially outside the armature 10 and outside the reduction gear mechanism, while the coupling part 44*c* is rotatably supported by two bearings (not illustrated herein) so that as the moving part 44*a* moves following the plunger 38, such movement thereof is converted to rotational movement of the coupling part 44*c*, thus enabling the moving part 44*b* which is rotating therewith to operate the lower protrusion 61*b*.

As shown in FIG. 5, the plate 7 is provided substantially in a circular form subject to rotational restriction with respect to the front housing 22 by means of protrusions 7*a* formed at two locations on the outer periphery thereof. On this plate 7 are set up an opening 7*b* from which the upper protrusion 61*a* is taken out and a slot 7*c* from which the lower protrusion 61*a* is taken out. The opening 7*b* from which the upper protrusion 61*a* is taken out is formed to extend radially toward the pinion moving body 4 so that the upper protrusion 61*a* can move as being pulled by rotation of the pinion moving body 4 while still being engaged with the protrusions and grooves 31*a* of the flange 31.

In this embodiment, the output shaft 3 rotates in the clockwise direction when taken from the left in FIG. 1, and the direction of spiraling of the helical spline (spiral spline) 3*a* of the output shaft 3 is a clockwise direction when taken toward the direction in which the pinion moving body 4 moves to engage with the ring gear 29.

In operation, upon closing the key switch 36, current flows from a battery 45 to the attraction coil 37 of the electromagnet switch 5 to generate a magnetic force, which attracts and moves the plunger 38 upward in FIG. 7. This movement of the plunger 38 turns the rod 44 in the A-direction as shown in FIG. 6 and is transmitted to the rotation restricting member 6 through the driving part 44*b*, thereby causing the rotation restriction member 6 to move downward while flexing the spring 43 (FIG. 5). This enables the upper protrusion 61*a* of the rotation restricting member 6 to move downward toward the flange of the pinion moving body 4 and engages with the protrusions and grooves 31*a* provided on the outer periphery of the flange 31 of the pinion moving body 4.

On the other hand, as shown in FIG. 7, in the electromagnet switch 5, current flows from the battery 45 to the armature 10 as movement of the plunger 38 makes the movable contact 39 abut on both fixed contacts 41 and 42 to close a space therebetween, and the armature 10 starts rotating. As shown in FIG. 1, rotation of the armature 10 is first reduced by the reduction gear mechanism, then transmitted to the output shaft 3 to cause the output shaft 3 to rotate in the reduced speed. This rotation tends to rotate the pinion moving body 4. However, inasmuch as the resilient restricting member 61 of the rotation restricting member 6 is accommodated in the restricting member holder 62 under the resiliently deformed state, the resilient restricting member 61 can not flex further more unless rotary force in excess of the load caused by the deformation is applied. Thus, the pinion moving body 4 is restricted from rotating within the range of the loading of the resilient restricting member 61.

The rotation of the output shaft 3 acts upon the pinion moving body 4 thus restricted from rotating as propulsion due to the meshing of helical splines 3*a* and 4*a*. This results in causing the pinion moving body 4 to move on the output shaft 3 in the axial direction to let the end face of the pinion gear 30 of the pinion moving body 4 to come into contact with the end face of the ring gear 29.

The pinion gear 30 thus moving toward the end face of the ring gear 29 moves further and meshes with the ring gear 29 as long as its protrusions aligns with grooves of the ring gear 29. If not, with the end faces abutting each other, the advancing movement of the pinion gear 30 is restricted.

At this instant, the rotary force of the output shaft 3 acts as the rotary force of the pinion moving body 4. Thus, the rotary force of the pinion moving body 4 exceeding the load resulting from the resilient deformation acts on the upper protrusion 61*a* engaged with the protrusions and grooves 31*a* of the flange 31. As the resilient restricting member 61 further deforms and flexes a little, the pinion moving body 4 is enabled to mesh with the ring gear 29 due to a small rotation of the pinion gear 30 at least by one pitch with the protrusions of the pinion gear 30 and the grooves of the ring gear 29. The pinion moving body 4 thus is allowed to move on the output shaft 3 to let the pinion gear 30 completely mesh with the ring gear 29.

Upon sufficient movement of the pinion moving body 4, the upper protrusion 61*a* which has engaged the protrusions and grooves 31*a* disengages therefrom and falls behind the washer 33 provided at the rear of the pinion moving body 4. The upper protrusion 61*a* restricts the pinion moving body 4 from retreating due to the rotary force which the pinion moving body 4 receives from the ring gear 29. Thus, the starter drives the engine to rotate.

After the engine starts, the key switch 36 (FIG. 7) is turned off to stop current supply to the attraction coil 37, then the attraction force of the plunger 38 of the electromagnet switch 5 disappears so that the load biasing the rotation restricting member 6 downward in FIG. 1 via the rod 44 no longer exists. As a result, because a reaction of the spring 43 pushes back the rotation restricting member 6 upward in FIG. 1, the upper protrusion 61*a* leaves from the rear side of the washer disposed behind the rear side of the pinion moving body 4. The pinion moving body 4 is released from the upper protrusion 61*a* which restricts retreat of the pinion moving member 4 and returned by the force of the spring 34 to the stationary position (position shown in FIG. 1) at which it is held prior to the start of the starter.

According to this embodiment, the resilient restricting member 61 which restricts the pinion moving body 4 from rotating is accommodated in the frame of the restricting member holder 62 under the preliminarily flexed and loaded state. As a result, the rotation restricting member 6 has a sufficient rotation-restricting function as long as the rotary force of the pinion moving body 4 does not exceed the load acting thereon at the time of engagement and restriction of rotation. When the pinion gear 30 abuts the end face of the ring gear 29 and the pinion moving body 4 is restricted from moving forward, the entire rotary force of the output shaft 3 acts on the pinion moving body 4. The resilient restricting member 61 flexes further in the restricting member holder 62 to allow rotation of the pinion moving body 4, thus enabling the pinion gear to mesh the ring gear 29.

Thus, as the rotary force of the output shaft 3 is converted to the advancing force of the pinion moving body 4 surely even when the spiraling of the helical spline is not so large, a pinion-pushing mechanism can be reduced in size. Further, as the protrusions and the grooves of the pinion gear 30 and the ring gear 29 can be aligned with ease, stable meshing operation can be attained. A starter which has a compact-sized meshing mechanism and a high meshing performance can be provided. It is to be noted that, as long as the load which the resilient restricting member 61 has in the restricting member holder 62 under the flexed state is set to withstand sufficiently the inertia force which is applied to the pinion moving body 4 in the rotation direction at the time of start of rotation of the output shaft 3, the pinion moving body 4 does not rotate at the same time as the start of rotation of the output shaft 3 without advancing movement. This advantage may be attained to a certain extent even if the load is set a little lower.

[Second Embodiment]

Figure 8:
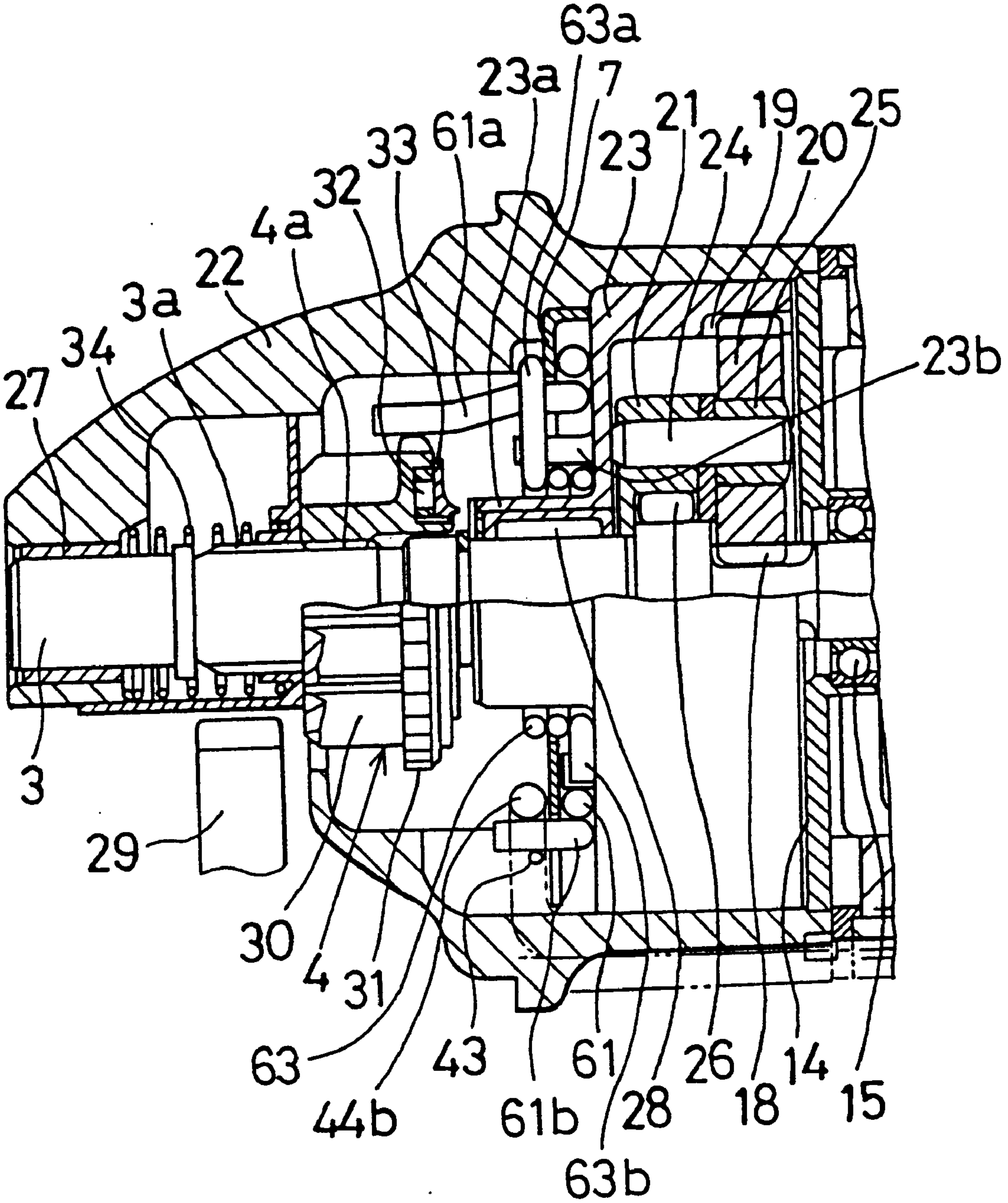
FIG. 8 is a sectional view showing partly a starter according to a second embodiment of the present invention.
Figure 9:
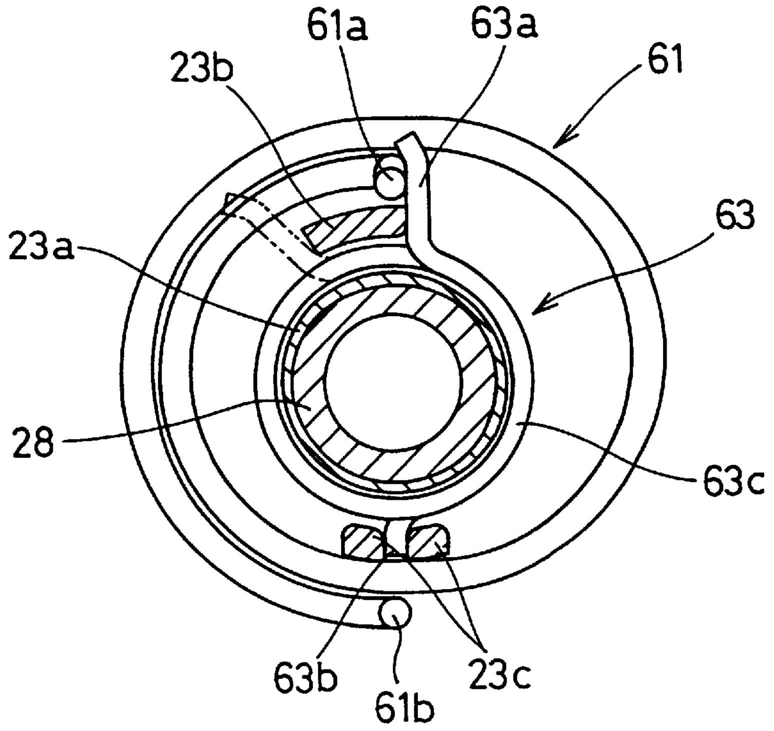
FIG. 9 is a front view showing partly in section a rotation restricting member used in the second embodiment.
Figure 10:
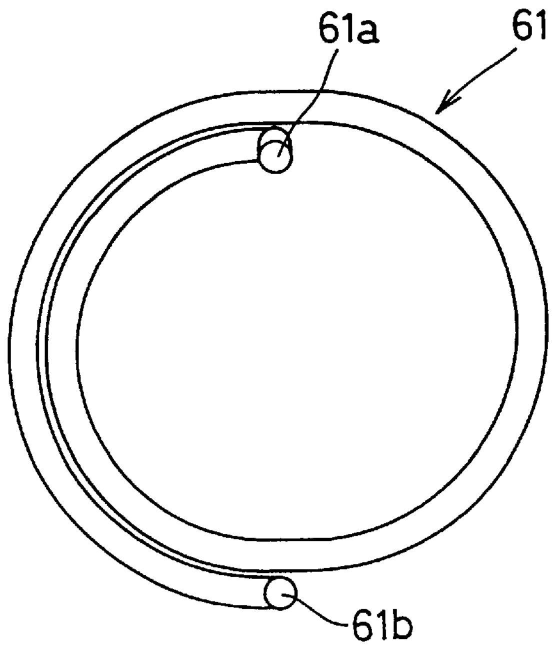
FIG. 10 is a front view showing a resilient restricting member used in the second embodiment.

In this embodiment shown in FIGS. 8, 9 and 10, the resilient restricting member 61 (FIG. 10) is a little different in shape from the resilient restricting member 61 of the first embodiment. Both ends 61*a* and 61*b* are formed at positions substantially symmetric with respect to the center of the looped part.

A biasing member 63 is formed in a spiral coil spring shape and its coiled part 63*c* is fitted around the outer periphery of the inner cylindrical part 23. As shown in FIG. 9, one end (engagement part 63*a*) is extended radially upward with its end being engaged with the upper protrusion 61*a* of the resilient restricting member 61. The other end (engagement part 63*b*) is also extended radially downward with its end being press-fitted between a pair of fixed protrusions 23*c* provided on the gear constituting part 23. The biasing member 63 is in such a shape as shown by one-dot chain line under the non-biased condition. It is hooked temporarily on a provisional protrusion 23*b* provided on the gear constituting member 23 under the state that the engagement part 63*a* is flexed in the clockwise rotation direction and does not return.

The plate 7 is in the shape as in the first embodiment, and the guide wall 7*d* holds directly the outer configuration of the resilient restricting member 61 slidably.

In operation, when the electromagnet switch 5 is turned on, the operation part 44*b* of the rod 44 turns and the lower protrusion 61*b* of the resilient restricting member 61 moves downward in FIGS. 8 and 9, while flexing the spring 43. Then, the upper protrusion 61*a* of he resilient restricting member 61 engages with the protrusions and grooves 31*a* of the pinion moving body 4.

While the motor 2 is energized through the electromagnet switch 5 to rotate the armature 10 and the output shaft 3, the pinion moving body 4 tends to rotate also. As the pinion moving body 4 is restricted from rotating by the load of the biasing member 63 which biases resiliently the upper protrusion 61*a* of the resilient restricting member 61, the rotation of the output shaft 3 acts as a thrust for advancing the pinion moving body 4 through the action of the helical splines 3*a* and 4*a*. Thus, the pinion moving body 4 moves toward the ring gear 29.

The pinion gear 30 advancing thus toward the end face of the ring gear 29 abuts the end face of the ring gear 29 and is stopped from advancing further, when its teeth protrusions and grooves 31*a* do not align with those of the ring gear. At this moment, the rotary force of the output shaft 3 acts through the pinion moving body 4 in a direction to flex the biasing member 63 further. As a result, as the pinion gear 30 is enabled to turn at this position, the teeth protrusions and grooves of the pinion gear 30 and the ring gear 29 align each other. The pinion moving body 4 thus advances further until the pinion gear 30 and the ring gear 29 meshes fully, thereby enabling the starter 1 to drive the engine.

According to this embodiment, not only the same advantages as in the first embodiment is provided, but also the stress which occurs at the time of resilient deformation of the rotation restricting member 61 and the biasing member 63 can be relaxed by the use of two resilient members 61 and 63. Thus, durability of the rotation restricting member and the biasing member to which the stress is repeatedly applied frequently can be improved.

[Modification of Second Embodiment]

Figure 11:
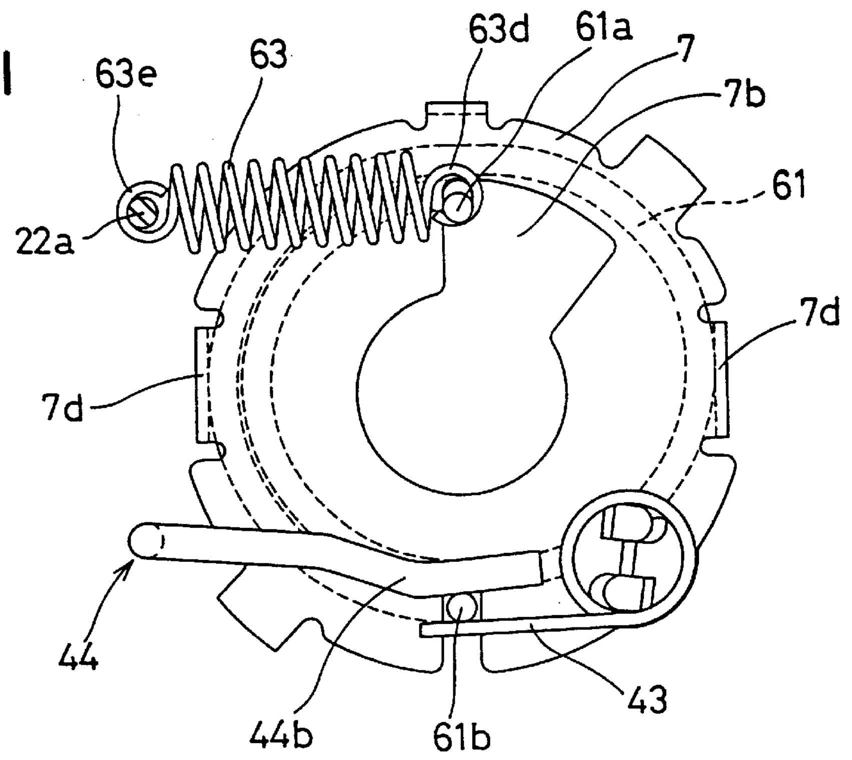
FIG. 11 is a front view showing a modification of the rotation restricting member used in the second embodiment.

In this embodiment, as shown in FIG. 11, the biasing member 63 is changed to a tension coil spring. The biasing member 63 has an engagement part 63*d* at one end which is engaged with the upper protrusion 61*a* of the resilient restricting member 61 and an engagement part 63*e* at the other end is engaged with the protrusion 22*a* provided on the front housing 22. The upper protrusion 61*a* of the resilient restricting member 61 is guided by the inner wall end of the opening 7*b* of the plate 7 to slide upward and downward in the figure.

The operation and the advantage are the same as in the second embodiment.

[Third Embodiment]

Figure 12:
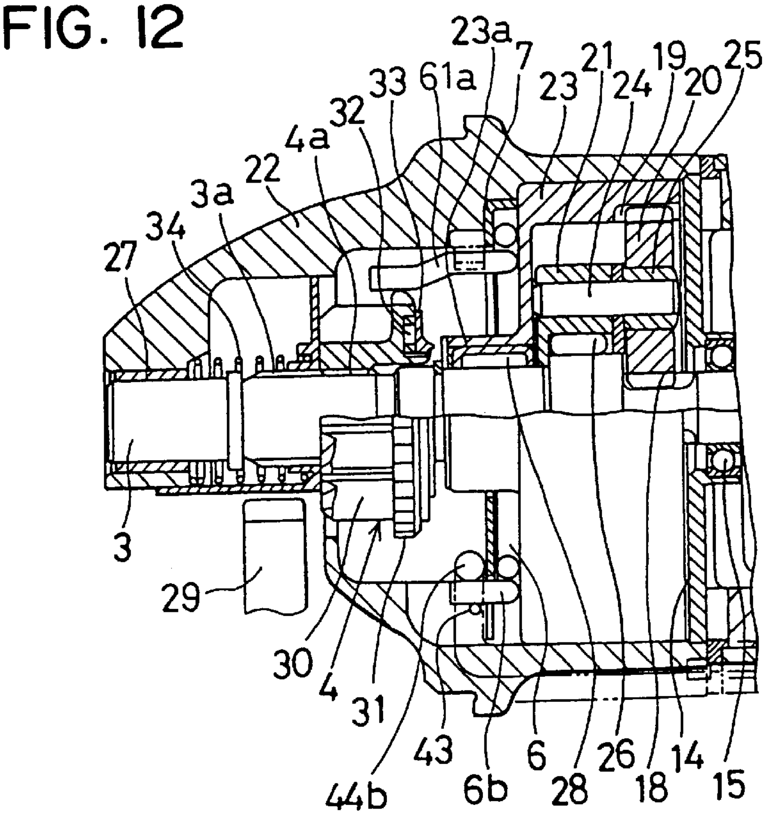
FIG. 12 is a sectional view showing partly a starter according to a third embodiment of the present invention.
Figure 13:
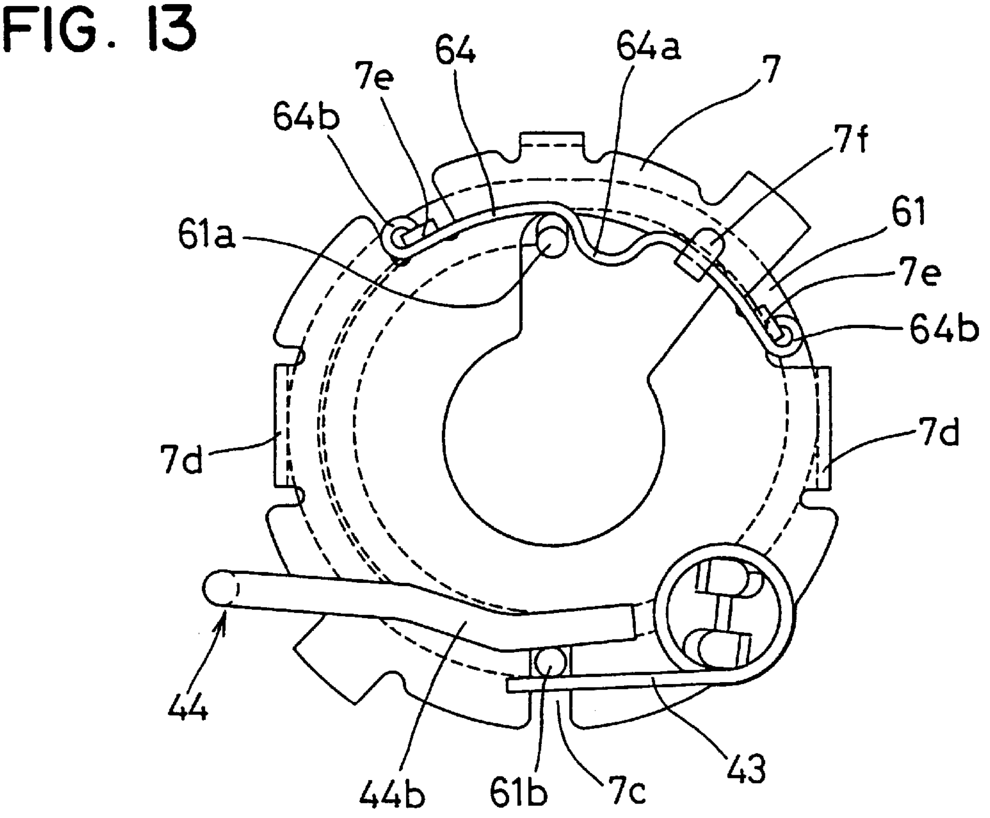
FIG. 13 is a front view showing a rotation restricting member used in the third embodiment.

In this embodiment shown in FIGS. 12 and 13, the resilient restricting member 61 has the similar shape as in the second embodiment shown in FIG. 10. The overriding stopper 64 is formed by a plate spring material in a generally arcuate shape, and both ends 64*b* are bent to engage with a fixed protrusion 7*e* provided on the plate 7. Its generally central part is curbed and protruded in the radially inward direction to form an overriding part 64*a*. The arcuate part at the right side is also supported by a holding part 7*f* of the plate 7 not to fall in the radially inward side.

In operation, when the electromagnet switch 5 is turned on, the operation part 44*b* of the rod 44 turns and the lower protrusion 61*b* of the resilient restricting member 61 moves downward in the figure while flexing the spring 43. Then, the upper protrusion of the resilient restricting member 61 engages with the teeth protrusions and grooves 31*a* of the pinion moving body 4.

While the motor 2 is energized through the electromagnet switch 5 to rotate the armature 10 and the output shaft 3, the pinion moving body 4 tends to rotate also. As the upper protrusion 61*a* of the resilient restricting member 61 abuts the overriding part 64*a* of the overriding stopper 64, the pinion moving body 4 is disabled to rotate and is restricted from rotating. The rotation of the output shaft 3 acts as a thrust for advancing the pinion moving body 4 through the action of the helical splines 3*a* and 4*a*. Thus, the pinion moving body 4 moves toward the ring gear 29. The pinion gear 30 advancing thus toward the end face of the ring gear 29 abuts the end face of the ring gear 29 and is stopped from advancing further, when its teeth protrusions and grooves do not align with those of the ring gear. At this moment, the rotary force of the output shaft 3 acts through the pinion moving body 4 and the upper protrusion 61*a* of the resilient restricting member 61 to flex the overriding stopper 64. When the rotary force exceeds the predetermined load, the upper protrusion 61*a* is allowed to rotate further so that the pinion gear 30 rotates also. As a result, when the teeth protrusions and grooves of the pinion gear 30 and the ring gear 29 align each other, the pinion moving body 4 advances further until the pinion gear 30 and the ring gear 29 meshes fully, thereby enabling the starter 1 to drive the engine.

[Fourth Embodiment]

Figure 14:
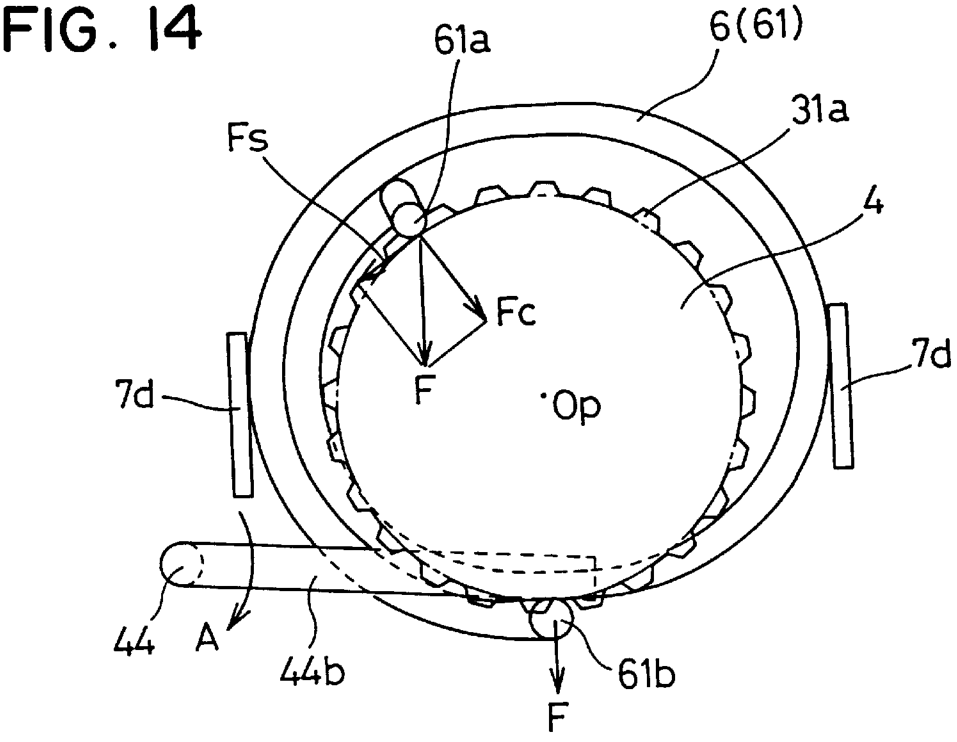
FIG. 14 is a front view showing a relation between the rotation restricting member and a pinion moving body used in a fourth embodiment of the present invention.

In this embodiment shown in FIG. 14, the rotation restricting member 6 is constructed solely by the resilient restricting member 61 as in the first embodiment. The resilient restricting member 61 has generally the same shape as in the first embodiment. However, it is not accommodated within the restricting member holder 62 but sandwiched by the gear constituting part 23 and the plate 7 directly in the axial direction.

The lower protrusion 61*b* of the resilient restricting member 61 is located at substantially the center below in the moving direction of the rotation restricting member 61, while the upper protrusion 61*a* is located at a position displaced a little toward the left in the figure from above in the opposite moving direction with respect to the pinion moving body 4. The resilient restricting member 61 has arcuate outer parts supported slidably by a guide wall 7*d* provided by bending a part of the plate 7 and is arranged to be slidable in the upward and downward directions in the figure. The lower protrusion 61*b* is biased upward in the figure by the spring 43 as in the first embodiment.

In operation, when the electromagnet switch 5 is turned on, the operation part 44*b* of the rod 44 turns in the A-direction and the lower protrusion 61*b* of the resilient restricting member 61 moves downward by the force of load F flexing the spring 43.

The upper protrusion 61*a* of the resilient restricting member 61 engages with the protrusions and grooves 31*a* of the pinion moving body 4. However, as the lower protrusion 61*b* moves downward further by the operation part 44*b* of the rod 44, the upper protrusion 61*a* applies the load F to the pinion moving body 4 in a direction of force which the resilient restricting member 61 receives. Because this load is not directed to the center of the pinion moving body 4 when viewed from the upper protrusion 61*a*, the component of force (Fs) acts on the pinion moving body 4 in a direction opposite to the direction of rotation of the output shaft 3. This component force Fs acts as a restricting force when the pinion moving body 4 tends to rotate by the rotation of the output shaft 3.

As described above, unless the rotary force of inertia of the pinion moving body 4 does not exceeds the load Fs at the time of start of rotation of the output shaft 3, the resilient restricting member 61 does not flex in the direction of rotation of the pinion moving body 4. As a result, the resilient restricting member 61 acts to restrict the rotation restricting member 6 from rotating so that, when the pinion gear 30 abuts the end face of the ring gear 29, the resilient restricting member 61 flexes further to enable the pinion gear 30 to mesh the ring gear 29. It is clear that this embodiment also has the same advantage as the first embodiment. Thus, as the rotary force of the output shaft 3 is converted to the advancing force of the pinion moving body 4 surely even when the spiraling of the helical spline is not so large, a pinion-pushing mechanism can be reduced in size. Further, as the protrusions and the grooves of the pinion gear 30 and the ring gear 29 can be aligned with ease, stable meshing operation can be attained. A starter which has a compact-sized meshing mechanism and a high meshing performance can be provided as in the first embodiment.

In the same manner as in the other embodiments, when the pinion moving body 4 tends to rotate, the load acts to restrict the rotation in the opposite direction. Thus, no special component parts other than the resilient restricting member 61 are needed to provide the advantage. It is very advantageous that a starter having a good meshing capability can be provided with less number of component parts and in low cost.

The present invention should not be limited to the above disclosed embodiments and modification but may be altered or changed further without departing from the spirit of the invention.

What is claimed is:

1. A starter comprising:

a motor for generating a rotary driving force;

a driving shaft driven by the motor and formed with a helical spline on an outer peripheral surface;

a pinion moving body having a pinion gear for meshing with a ring gear of an engine and fitted through a spline-fitting on the driving shaft movably in an axial direction;

a rotation restricting device engageable with the pinion moving body for restricting rotation of the pinion moving body;

a driving device for driving the rotation restricting device to the pinion moving body; and a resilient restricting member biased with an initial load in a direction opposite to a rotation direction of the driving shaft, wherein the pinion moving body is rotatable together with the rotation restricting device only when receiving a rotary force in excess of a predetermined level in a rotation direction from the driving shaft upon engagement of the rotation restricting device.

2. A starter as claimed in claim 1, wherein the rotation restricting device includes a holder for holding the resilient restricting member in a biased condition.

3. A starter as claimed in claim 2, wherein the resilient restricting member is held biased before engaging the pinion moving body.

4. A starter as claimed in claim 2, wherein the initial load is applied by a resilient member disposed between the resilient restricting member and a fixed member.

5. A starter as claimed in claim 1, wherein the rotation restricting device applies a load in the direction opposite to the rotation direction of the driving shaft as a component of a load generated by resilient deformation when engaging the pinion moving body.

6. A starter for an engine having a ring gear, comprising:

a motor for generating a rotary driving force;

a driving shaft driven by the motor;

a pinion moving body spline-fitted on the driving shaft and having a pinion gear engageable with the ring gear;

a rotation restricting device disposed near the pinion moving body and engageable with the pinion moving body for restricting rotation of the pinion moving body and advancing the pinion moving body axially on the driving shaft, the rotation restricting device having a resilient looped part normally held biased by a predetermined biasing force in a direction opposite to a rotation direction of the driving shaft; and a driving device for driving the rotation restricting device to engage the pinion moving body.

7. A starter as claimed in claim 6, wherein the rotation restricting device further has a biasing part for holding the resilient looped part in a biased state to enable the pinion moving body to rotate with the rotation restricting device only in response to a rotary force in excess of the predetermined biasing force.

8. A starter as claimed in claim 6, wherein the rotation restricting device further has a holder accommodating the resilient looped part and a holding part for holding the resilient looped part in a biased state to enable the pinion moving body to rotate with the rotation restricting device only in response to a rotary force in excess of the predetermined biasing force.

9. A starter as claimed in claim 6, further comprising:

a fixed part;

a biasing member attached to the fixed part and to the resilient looped part for applying a biasing force externally to the resilient looped part to hold the resilient looped part in a biased state.

10. A starter as claimed in claim 6, wherein the rotation restricting device further has a first protrusion extending axially from one end of the resilient looped part for engaging the pinion moving body and a second protrusion connected to the driving device at another end of the resilient looped part, wherein the looped part is flexed to a smaller diameter to enable the first protrusion to rotate with the pinion moving body only in response to a rotary force in excess of the predetermined biasing force.

11. A method of operating a starter having a motor, a driving shaft driven by the motor, a pinion moving body spline-fitted on the driving shaft for engaging with a ring gear of an engine, and a rotation restricting member including a resilient loop for restriction rotation of the pinion moving body, the method comprising:

driving the motor to rotate the driving shaft;

driving the rotation restricting member to engage the pinion moving body;

applying a biasing force to the resilient loop in a direction opposite to a rotation direction of the driving shaft;

maintaining engagement of the rotation restricting member with the pinion moving body to advance the pinion moving body along the driving shaft toward the ring gear; and flexing the resilient loop to a smaller diameter to allow the pinion moving body to rotate with the driving shaft and engage the ring gear only when a predetermined force in excess of the biasing force is applied from the driving shaft through the pinion moving body.

* * * * *